United States Patent
Liu et al.

(10) Patent No.: US 8,599,468 B2
(45) Date of Patent: Dec. 3, 2013

(54) PULSE-WIDTH-MODULATED THERMAL TUNING OF OPTICAL DEVICES

(75) Inventors: Frankie Y. Liu, Palo Alto, CA (US);
Dinesh D. Patil, Fremont, CA (US);
Ronald Ho, Mountain View, CA (US);
Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 141 days.

(21) Appl. No.: 13/205,749

(22) Filed: Aug. 9, 2011

(65) Prior Publication Data
US 2013/0038920 A1    Feb. 14, 2013

(51) Int. Cl.
*G02F 1/01*        (2006.01)

(52) U.S. Cl.
USPC ............................................................. 359/288

(58) Field of Classification Search
USPC ................. 359/238, 240, 288, 289; 341/144
See application file for complete search history.

(56) References Cited

U.S. PATENT DOCUMENTS

| | | | | |
|---|---|---|---|---|
| 6,629,638 | B1* | 10/2003 | Sanchez | 235/454 |
| 6,816,097 | B2* | 11/2004 | Brooks et al. | 341/143 |
| 2007/0211992 | A1* | 9/2007 | chu et al. | 385/32 |

* cited by examiner

*Primary Examiner* — Stephone Allen
*Assistant Examiner* — James McGee
(74) *Attorney, Agent, or Firm* — Park, Vaughan, Fleming & Dowler LLP; Steven E. Stupp (57) ABSTRACT

An optical device that includes a wavelength-sensitive optical component, which has an associated thermal time constant, is described. Note that an operating wavelength of the wavelength-sensitive optical component is a function of several physical parameters including temperature. Moreover, the optical device includes a heating mechanism that provides heat to the wavelength-sensitive optical component. Furthermore, the optical device includes a driver circuit that provides a pulse-width modulated signal to the heating mechanism. Note that an average pulse-width modulated heat provided by the heating mechanism, and which corresponds to the pulse-width modulated signal, thermally tunes the wavelength-sensitive optical component to a target operating wavelength. Additionally, note that the target operating wavelength corresponds to a target operating temperature of the wavelength-sensitive optical component.

20 Claims, 9 Drawing Sheets

FIG. 9

PULSE-WIDTH-MODULATED THERMAL TUNING OF OPTICAL DEVICES

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure relates to optical devices. More specifically, the present disclosure relates to optical devices in which a pulse-width modulated signal is used to thermally tune a wavelength-sensitive optical component to a target operating wavelength.

2. Related Art

Wavelength division multiplexing (WDM) can be used to communicate modulated data at different carrier wavelengths on a common optical waveguide. By transmitting data using multiple carrier wavelengths, WDM can overcome optical-fiber congestion, which is a potential problem in optical modules that include parallel optical transceivers with one channel per optical fiber or waveguide. Hence, by significantly reducing the number of optical fibers per optical module, WDM can simplify optical modules and can thereby reducing their cost and size.

One variety of WDM, which is known as "dense WDM" (DWDM) uses a narrow spacing between adjacent wavelengths. In DWDM, data bits are typically modulated directly onto highly stable optical carrier frequencies, and these carriers combined in an optical fiber. DWDM allows a given wavelength band to accommodate a large number of channels, and thus offers high performance. DWDM systems employ a variety of optical devices, such as: optical waveguides, optical modulators, optical multiplexers (such as add filters), optical de-multiplexers (such as drop filters), optical proximity couplers, optical filters, optical switches and optical detectors. While some of these optical devices (such as optical waveguides, optical proximity couplers and optical detectors) are broadband components that are relatively insensitive to ambient temperature changes and process variations, wavelength-selective optical devices (such as resonator-based optical modulators, optical multiplexers, optical filters and optical de-multiplexers), which include wavelength-sensitive optical components, can be very sensitive to these changes and variations.

In principle, optical devices can be made on silicon substrates, because silicon provides many benefits for optical communication. Furthermore, by using silicon-on-insulator (SOI) technology, a silicon optical waveguide can be surrounded by silicon dioxide on all four sides, which facilitates low-loss, on-chip optical waveguides and active devices (such as optical detectors and optical modulators). Silicon-based optical devices can thus be used to implement a wide variety of optical components for use in DWDM communication.

Static errors in manufacturing these silicon-based optical devices include deviations in intended thickness of the silicon layer, deviations in waveguide width, or deviations in the etch depth of ridge waveguides. These deviations cause errors in the operating wavelengths of the wavelength-selective optical devices. For example, a deviation of one nanometer in one of these dimensions can cause 1-2 nm of shift in the operating wavelength of the optical device, depending on its size and other physical technology parameters. It is therefore often necessary to phase tune these optical devices to eliminate these static errors.

Additionally, it may be necessary to phase tune the optical device dynamically (during operation) to maintain accurate alignment of the operating wavelengths (relative to predetermined desired or target operating wavelengths). For example, a tuning precision within a few tens of picometers may be required for a MUX/DEMUX device (and possibly even less in the case of a modulator device), in order to combat dynamic environmental changes such as temperature or material strain. Hence, the ability to tune the resonators both statically and dynamically is paramount in a practical implementation.

Thermal tuning is a useful technique for phase tuning an optical device because it can produce large shifts in the operating wavelength of a silicon optical device. One approach is to put a metal heater on top of the optical device. Another approach heats up the optical device by doping it as a resistor and passing current directly through the device. The former is slightly less efficient than the latter, while the latter must avoid interfering with the operation of the optical device or introducing unwanted optical loss.

Figure 1:
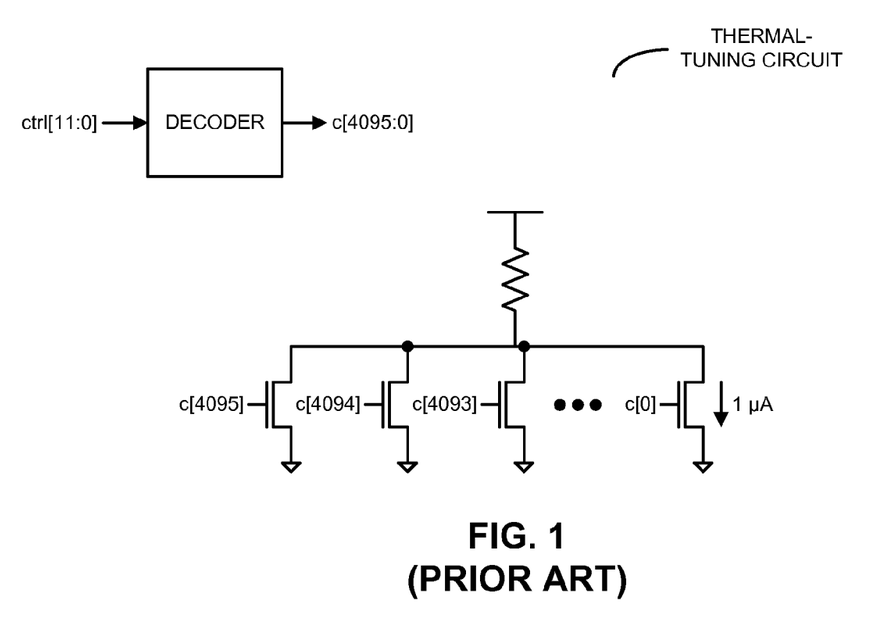
FIG. 1 is a block diagram illustrating an existing thermal-tuning circuit.

Because of the static and dynamic changes in the target operating wavelength, and the high sensitivity of silicon optical devices to temperature, precision control of the heater over a large range is often necessary in order to select the operating wavelength while providing a suitable upper bound on ripple values. For example, if a current source is used to drive between 0-4 mA of current through the heater, up to 4000 steps of current levels may be needed. As shown in FIG. 1, an existing implementation of a thermal-tuning circuit which can achieve such a precise tuning current may include multiple copies of a baseline circuit, each of which can be separately enabled or disabled in order to increase or decrease a reference current or voltage. In particular, a single transistor in this baseline circuit may generate a single step's worth of tuning current, $I_0$. Moreover, generating a current of $m \cdot I_0$ may involve combining the outputs of m transistors. For 1 µA steps and a 4 mA range, 4000 copies of the transistor are needed. However, this may result in a large area overhead.

In addition, because manufacturing variations in the threshold voltage or length may cause each transistor to deviate significantly from $I_0$, which may result in large non-linearities in the total output current, each transistor may need to be trimmed or otherwise compensated to ensure that it truly generates an $I_0$ of 1 µA. Consequently, the existing thermal-tuning circuit may be complicated and expensive, and may have significant power consumption.

Hence, what is needed is an optical device without the above-described problems.

SUMMARY

One embodiment of the present disclosure provides an optical device that includes a wavelength-sensitive optical component having an associated thermal time constant, where an operating wavelength of the wavelength-sensitive optical component is a function of several physical parameters including temperature. Moreover, the optical device includes a heating mechanism (such as a resistive heater), which is thermally coupled to the wavelength-sensitive optical component, and which provides heat to the wavelength-sensitive optical component. Furthermore, the optical device includes a driver circuit, which is electrically coupled to the heating mechanism, and which provides a pulse-width modulated signal to the heating mechanism. Note that an average pulse-width modulated heat provided by the heating mechanism, and which corresponds to the pulse-width modulated signal, thermally tunes the wavelength-sensitive optical component to a target operating wavelength. Additionally, note that the target operating wavelength corresponds to a target operating temperature of the wavelength-sensitive optical component.

The driver circuit may include a pulse-width modulation circuit, which includes a linear counter having fixed time increments. For example, the pulse-width modulated signal includes a pulse-width modulated current. Moreover, the pulse-width modulated signal may include two or more signal levels that can be selected from multiple pre-defined signal levels, thereby specifying an amplitude of the pulse-width modulated signal.

Furthermore, the signal levels in the pulse-width modulated signal may include a first signal level and a second signal level. During a period of the pulse-width modulated signal, the pulse-width modulated signal may include a first pulse having a first time duration in the first signal level and a second pulse having a second time duration in the second signal level, thereby specifying a duty cycle of the pulse-width modulated signal. Note that the duty cycle, in conjunction with the heating mechanism and the time constant, may correspond to the target operating temperature. In some embodiments, the period is smaller than the thermal time constant.

Alternatively, the driver circuit may include a sigma-delta modulation circuit, which includes a non-linear counter having different time increments. Thus, the pulse-width modulated signal may include a sigma-delta modulated signal. This sigma-delta modulated signal may have at least two signal levels, and the sigma-delta modulation circuit may include an offset corresponding to an average of the at least two signal levels, thereby shifting peak ripple values of the sigma-delta modulated signal to other than extremum duty-cycle values.

In some embodiments, the signal levels in the sigma-delta modulated signal include a first signal level and a second signal level. This sigma-delta modulated signal may include one or more instances of a modulation pattern having adjustable bit periods, where the average pulse-width modulated heat associated with the modulation pattern corresponds to the target operating temperature. Note that at least one of the adjustable bit periods may be a minimum bit period and/or may be smaller than the thermal time constant. Furthermore, the modulation pattern may have a smaller duration than the thermal time constant.

Another embodiment provides a system that includes the optical device.

Another embodiment provides a method for thermally tuning the wavelength-sensitive optical component. During this method, a target operating wavelength of the wavelength-sensitive optical component is specified. Then, using the driver circuit, the pulse-width modulated signal is provided to the heating mechanism. Note that the average pulse-width modulated heat provided by the heating mechanism, which corresponds to the pulse-width modulated signal, thermally tunes the wavelength-sensitive optical component to the target operating wavelength. Furthermore, note that the target operating wavelength corresponds to the target operating temperature of the wavelength-sensitive optical component.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical device, a system that includes the optical device, and a technique for thermally tuning a wavelength-sensitive optical component in the optical device are described. This optical device includes the wavelength-sensitive optical component, which has an associated thermal time constant. Note that an operating wavelength of the wavelength-sensitive optical component is a function of several physical parameters including temperature. Moreover, the optical device includes a heating mechanism that provides heat to the wavelength-sensitive optical component. Furthermore, the optical device includes a driver circuit that provides a pulse-width modulated signal to the heating mechanism. Note that an average pulse-width modulated heat provided by the heating mechanism, and which corresponds to the pulse-width modulated signal, thermally tunes the wavelength-sensitive optical component to a target operating wavelength. Additionally, note that the target operating wavelength corresponds to a target operating temperature of the wavelength-sensitive optical component.

This thermal-tuning technique may facilitate precise thermal tuning of the wavelength-sensitive optical component over a wide range of temperatures. Moreover, the thermal-tuning technique may address static and dynamic changes in the target operating wavelength using a pulse-width modulation circuit or a sigma-delta modulation circuit. This pulse-width modulation thermal-tuning circuit may reduce the complexity, power consumption, area and, thus, the cost of the optical device.

While the optical device is used as an illustration in the discussion that follows, note that the thermal-tuning technique can be used in a variety of applications, including applications other than thermal tuning of the optical device. Furthermore, the optical component may include one or more instances of numerous optical components, including: an optical modulator, an optical multiplexer, an optical de-multiplexer, an optical detector, an optical source, an optical switch, and/or an optical filter. In the discussion that follows, a ring resonator is used as an illustrative example. Additionally, note that, while communication of binary data is used as an illustrative example, in other embodiments more-than-two-level data can be communicated using the optical device and/or the system.

We now describe embodiments of the optical device. The preceding discussion indicated that tuning and, in particular, thermal tuning, can be a challenging problem for wavelength-sensitive optical components. Consequently, thermal-tuning structures with a wide heating range, a very small granularity of heating steps, and very low overhead are needed. In principle, this can be accomplished by modifying the structure of the optical device and/or the thermal-tuning mechanism. The thermal-tuning mechanism described below can provide fine-grained thermal currents over a wide range with minimal overhead.

In particular, an optical device with a pulse-width modulation current source may be combined with a resistive heater to tune the operating wavelength (such as the resonant wavelength of a ring resonator). This time-domain modulation, which switches the tuning current on and off periodically, allows the percentage of 'on' time of the current source to be precisely controlled (for example, with many bits of precision, such as 12 bits or more). Thus, by periodically shutting down and restarting the source of the thermal-tuning current, the optical device essentially time averages the heat generated in the resistive heater to reach a steady-state temperature.

Note that a constraint in the use of the thermal-tuning technique may be set by the thermal time constant of the optical device (which specifies the thermal response of the optical device and, thus, the averaging time constant) relative to the on/off times of the current source. For silicon-based optical devices, the thermal time constant is on the order of milliseconds, and can be directly calculated from the geometric properties of the optical device. In order to sufficiently average out the varying duty cycle of the current source, the on/off time is much faster than the thermal time constant. In particular, if the on/off cycling of the current source is too slow, the temperature of the optical device will oscillate along with the current source, i.e., the thermal tuning will fail. Thus, the minimum pulse-width of the current source may be on the order of nanoseconds.

Figure 2:
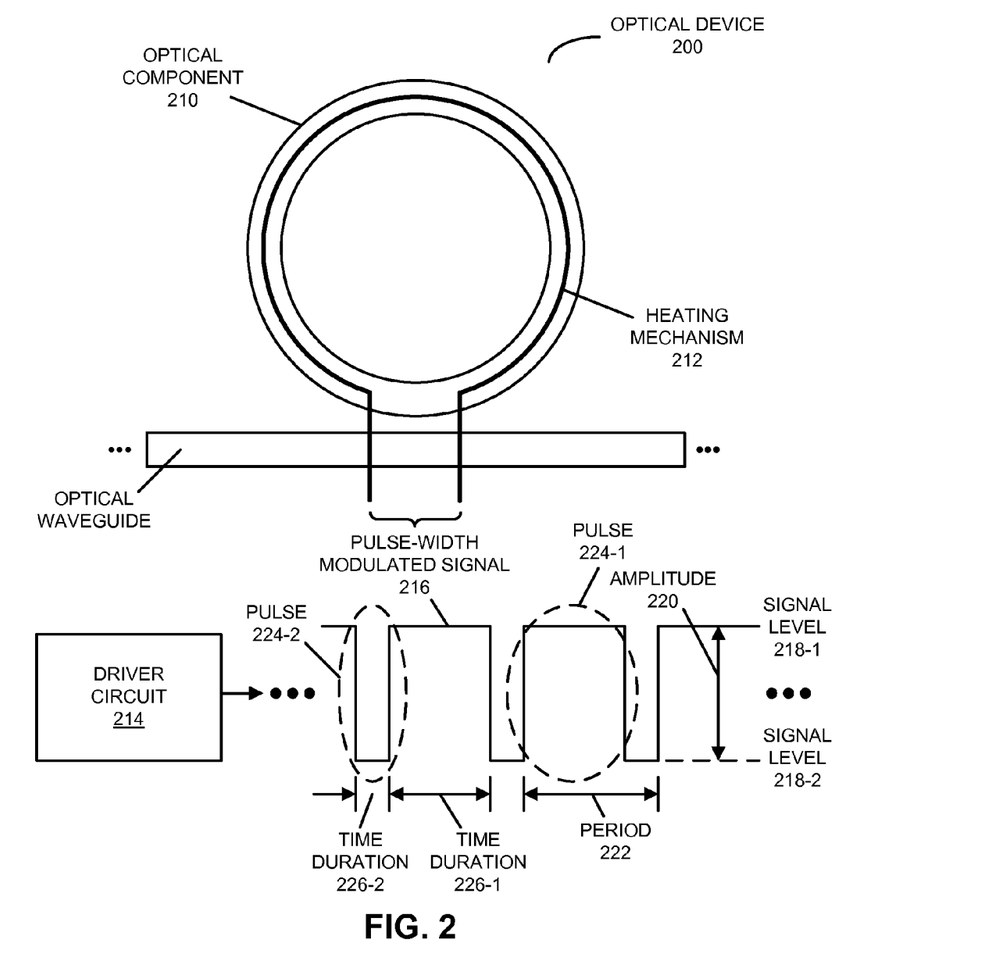
FIG. 2 is a block diagram illustrating an optical device in accordance with an embodiment of the present disclosure.

FIG. 2 presents a block diagram illustrating an optical device 200. This optical device includes a wavelength-sensitive optical component 210 having an associated thermal time constant, where an operating wavelength of wavelength-sensitive optical component 210 is a function of several physical parameters including temperature. Moreover, optical device 200 includes a heating mechanism 212 (such as a resistive heater), which is thermally coupled to wavelength-sensitive optical component 210, and which provides heat to wavelength-sensitive optical component 210. Furthermore, optical device 200 includes a driver circuit 214, which is electrically coupled to heating mechanism 212, and which provides a pulse-width modulated signal 216 to heating mechanism 212. Note that an average pulse-width modulated heat provided by heating mechanism 212, and which corresponds to pulse-width modulated signal 216, thermally tunes wavelength-sensitive optical component 210 to a target operating wavelength. Additionally, note that the target operating wavelength corresponds to a target operating temperature of wavelength-sensitive optical component 210.

In some embodiments, pulse-width modulated signal 216 includes a pulse-width modulated current. (However, in other embodiments pulse-width modulated signal 216 includes a pulse-width modulated voltage.) Moreover, pulse-width modulated signal 216 may include two or more signal levels 218 that can be selected from multiple pre-defined signal levels, thereby specifying an amplitude 220 of pulse-width modulated signal 216. Furthermore, during a period 222 of pulse-width modulated signal 216, pulse-width modulated signal 216 includes a pulse 224-1 having a time duration 226-1 in signal level 218-1 and a pulse 224-2 having a time duration 226-2 in signal level 218-2, thereby specifying a duty cycle of pulse-width modulated signal 216. Note that the duty cycle, in conjunction with heating mechanism 212, a thermal impedance and a heat capacity of optical device 200 (i.e., the thermal time constant), may correspond to the target operating temperature. Additionally, note that period 222 may be smaller than the thermal time constant. In an exemplary embodiment, time duration 226-2 may be 10% of period 222 (and much smaller than the thermal time constant), and time duration 226-1 may be 90% of period 222.

Figure 3:
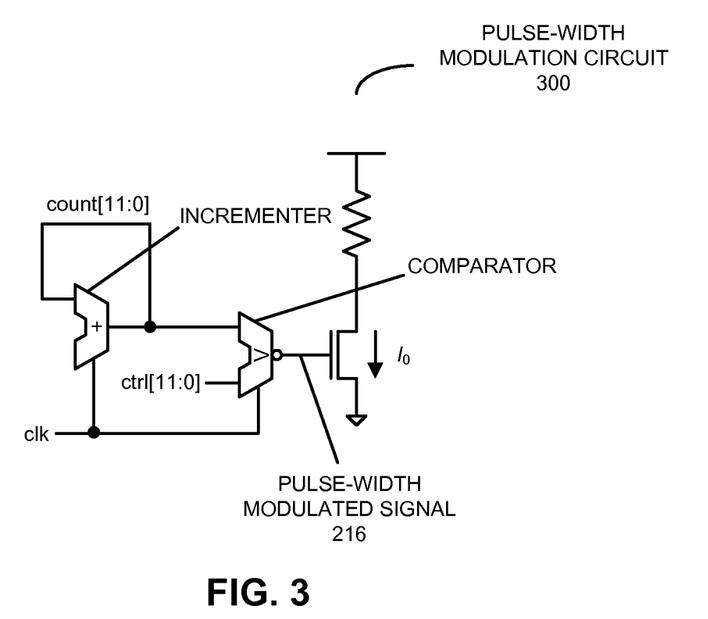
FIG. 3 is a block diagram illustrating a pulse-width modulation circuit for use in the optical device of FIG. 2 in accordance with an embodiment of the present disclosure.

Driver circuit 214 may include a pulse-width modulation circuit, which includes a linear counter having fixed time increments. This is shown in FIG. 3, which presents a block diagram illustrating a pulse-width modulation circuit 300 for use in optical device 200 (FIG. 2). In this circuit, an incrementer counts from 0 to a maximum value 2N, over the course of 2N clock cycles. When the incrementer starts counting, a current source is allowed to flow into heating mechanism 212 (FIG. 2). When the output of the incrementer reaches N, which takes half of the time, the current source is switched off. Then, when the incrementer reaches 2N, it is reset back to 0 and the current source is once again allowed to flow to the load. This example demonstrates a 50% duty cycle, and the load sees, on average, half the current flowing into it.

By setting the turn-on/turn-off time to a different value, different duty-cycle percentages can be obtained. For example, using N/2 gives a 25% duty cycle and ¼th of the current, and using 3·N/2 gives a 75% duty cycle at ¾th of the current. At the minimum extremum, using 1 leads to a 1/2N duty cycle and a correspondingly small average current value. Conversely, at the maximum extremum, using 2N−1 results in the maximum current value.

As noted previously, pulse-width modulation circuit 300 operates because the thermal-tuning load, when driven by the current, adjusts the temperature of optical device 200 (FIG. 2) in a way much slower than the clock cycle of pulse-width modulation circuit 300. In order to achieve average currents as low as 1 µA with a maximum range of 4 mA, the current source $I_0$ can be 4 mA, and the counter or incrementer can count to a total of 4096. At a target count of 1, pulse-width modulation circuit 300 create an average of 4/4096 mA, or approximately 1 µA; at a target of 2048, pulse-width modulation circuit 300 creates approximately 0.5 mA. Note that pulse-width modulation circuit 300 may only include a single current source, an incrementer, and a comparator. In contrast, the existing thermal-tuning circuit in FIG. 1 may include 4000 current sources, as well as trimming circuits.

In some embodiments, under certain duty-cycle percentages (i.e., different target counts), pulse-width modulation circuit 300 may generate larger ripple in the resulting optical-device temperature. This effect can be reduced by modifying the design to include multiple current sources. For example, suppose the current source is an aggregation of four different current sources, each providing 1 mA, and each counting to a total of 1024. Because these currents are still much higher than the smallest step of 1 µA, they may not need as much or any trimming or offset compensation. Furthermore, the total counting time is four times smaller, which may result in a larger ratio of time constants between driver circuit 214 (FIG. 2) and the silicon, and thus less temperature ripple.

Additionally, in some embodiments the multiple aggregated current sources may be replaced by a circuit that directly stores an analog value in a floating gate, giving a range of currents. In these embodiments, the pulse-width modulation technique described above may then efficiently mimic the functionality of a multiplying digital-to-analog converter. Such circuits can be designed to periodically inject charge into optical device 200 (FIG. 2), thereby providing an average current with a series of charge injection pulses. Once again, optical device 200 (FIG. 2) may only experience the temperature rise associated with the average heat generated by integrated heating mechanism 212 (FIG. 2) because of the larger time constant of the thermal response of optical device 200 (FIG. 2).

We now estimate the ripple in the resulting temperature of optical device 200 (FIG. 2). In general, the silicon volume being heated will develop a temperature that depends solely on its thermal resistance to a thermal ground. For example, the thermal ground can be a heat sink thermally coupled to optical device 200 (FIG. 2). (Note that, in the same way that an electrical ground is a voltage reference with effectively infinite capacity to hold charge, a thermal ground is a temperature reference with an effectively infinite capacity to take in heat.) Thus, heat power injected into the material will flow down its thermal resistance to the thermal ground, generating a temperature gradient up from the thermal ground.

The analogy of temperature and voltage makes this thermal model easy to understand. A heating mechanism injecting heat power into a material is analogous to current injected into a resistor network, with temperature (the product of the heat power and the thermal resistance) analogous to voltage (the product of current and electrical resistance). Furthermore, the temperature also depends on the thermal capacitance, which is the capacity of the material to absorb heat energy (the integrated power) while getting hot. Its analog is electrical capacitance, or the ability of the material to absorb charge (the integrated current) while changing voltage. In addition, the combination of the thermal capacitance and the thermal resistance results in a thermal time constant, which characterizes the exponential change in the temperature of the material with time. In other words, if the material is heated to a starting temperature Th and driver circuit 214 (FIG. 2) is turned off, the material will subsequently cool off subject to its thermal time constant τ (the product of its thermal resistance to ground and its thermal capacitance) with the relationship $$T(t) = Th \cdot \exp^{-\frac{t}{\tau}}. \quad (1)$$

Similarly, if the material starts at a temperature Tc and driver circuit 214 (FIG. 2) is turned on, heating the material to a temperature Tf, the temperature response is $$T(t) = Tf - (Tf - Tc) \cdot \exp^{-\frac{t}{\tau}}. \quad (2)$$

Suppose pulse-width modulation circuit 300 counts to 1024, and the current source turns off at 1024·d counts, where the duty cycle (d) ranges between 0 and 1. Furthermore, suppose that the thermal time constant of the material is 100 μs, and that the incrementer operates at 1 GHz, or 1 ns per count. Thus, the current source may turn on for a fraction d of the 1.024 μs period, and may turn off for the rest. Note that k represents the ratio of period 222 (FIG. 2) to the thermal time constant of the material. In this example, k is equal to 1.024 μs divided by 100 μs, or about 0.01.

If the temperature is normalized, so that it is between 0 and 1, then at 50% averaging, the desired final value is 0.5. However, because of the ripple, the temperature varies between two values, $T_A$ and $T_B$, which perfectly bracket 0.5. Note that at different averaging values, such as 25%, the two values $T_A$ and $T_B$ still surround the average value of 0.25, but not equally.

When the current source turns on, it imposes a step input for a fraction d of the incrementer period, heating the material from its initial temperature $T_A$. The step height is the distance from $T_A$ to 1, and so the rise in temperature during this time fraction d is given by $$T_B = 1 - (1 - T_A) \cdot \exp^{-d \cdot k}. \quad (3)$$

Once the heater turns off, the material cools down for the rest of the incrementer period. In steady-state, the temperature should be the same as it was initially, i.e., $$T_A = [1 - (1 - T_A) \cdot \exp^{-d \cdot k}] \cdot \exp^{-(1-d) \cdot k}. \quad (4)$$

Rearranging yields $$T_A = \exp^{-(1-d) \cdot k} - (1 - T_A) \cdot \exp^k \quad (5)$$

$$T_A \cdot (1 - \exp^{-k}) = \exp^{-k} \cdot (\exp^{d \cdot k} - 1) \quad (6)$$

or $$T_A = \frac{(\exp^{d \cdot k} - 1)}{(\exp^k - 1)}. \quad (7)$$

The heated temperature can be found by substituting for $T_A$, i.e., $$T_B = 1 - \left[1 - \frac{\exp^{d \cdot k} - 1}{\exp^k - 1}\right] \cdot \exp^{-d \cdot k}. \quad (8)$$

Rearranging yields $$T_B = \left[1 - \frac{\exp^k - 1 - \exp^{d \cdot k} + 1}{\exp^k - 1}\right] \cdot \exp^{-d \cdot k} \quad (9)$$

$$T_B = 1 - \frac{\exp^{(1-d) \cdot k} - 1}{\exp^k - 1} \quad (10)$$

or $$T_B = \frac{\exp^k - \exp^{(1-d) \cdot k}}{\exp^k - 1}. \quad (11)$$

Finally, the ripple is $T_B - T_A$:

$$T_B - T_A = \frac{\exp^k - \exp^{(1-d) \cdot k} - \exp^{d \cdot k} + 1}{\exp^k - 1} \quad (12)$$

$$= \frac{(1 - \exp^{d \cdot k}) \cdot (1 - \exp^{(1-d) \cdot k})}{\exp^k - 1}.$$

For sufficiently small k, the approximation $$\exp^x \approx 1 + x \quad (13)$$

can be used, and the ripple can be expressed as $$T_B - T_A = \frac{(1-(1+d\cdot k))\cdot(1-(1+(1-d)\cdot k))}{k} \quad (14)$$

or $$T_B - T_A = d\cdot(1-d)\cdot k \quad (15)$$

For small time constant ratios k, Eqns. 12 and 15 are nearly identical. These expressions are plotted in FIG. 4, which presents a graph of ripple associated with pulse-width modulation circuit 300 (FIG. 3) as a function of d and k.

Figure 4:
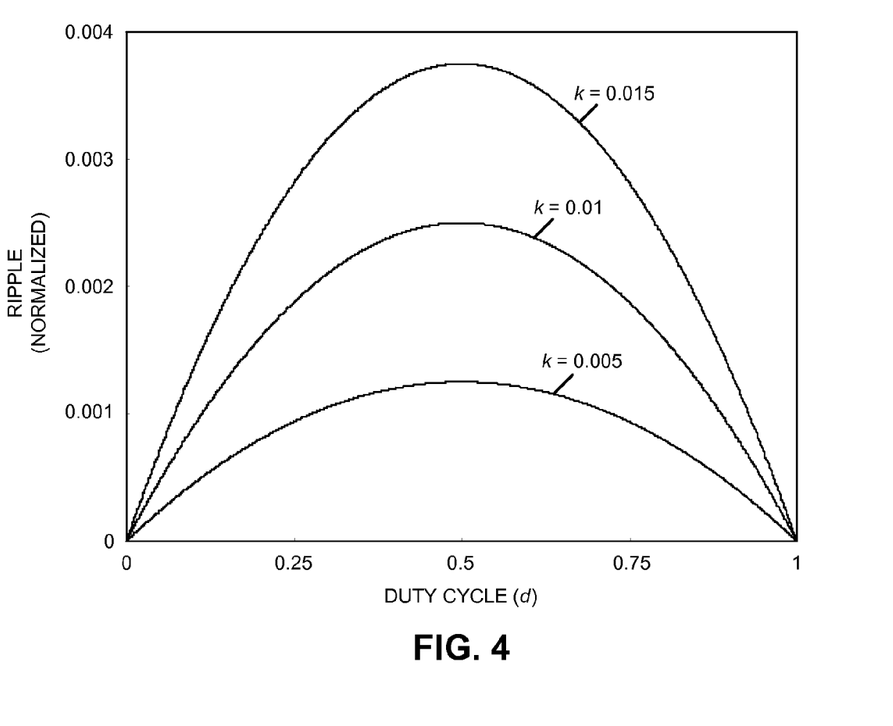
FIG. 4 is a graph of ripple associated with the pulse-width modulation circuit of FIG. 3 in accordance with an embodiment of the present disclosure.

Note that the maximum ripple is at the center duty cycle of 50%. This is because the temperature has the most time to rise from the applied heat power. Moreover, with k equal to 0.01, the ripple is about 0.0025, or about 1/400 of the temperature scale. However, at smaller duty cycles, the ripple is less because the heat is applied for only a very short time, and thus the material has very little time to heat up. Alternatively, at larger duty cycles, the ripple is less because the temperature step function applied to the material has a very low amplitude (i.e., the material is almost fully heated). Furthermore, the ripple plots in FIG. 4 are symmetric about d=0.5. This is because cooling and heating are reciprocal operations.

The preceding analysis can be used to determine the value of k for minimum ripple at a worst-case duty cycle of 50%. Suppose that the desired ripple is less than 0.5 of the least significant bit of the thermal tuning Given 4000 steps of the tuned temperature, this implies a ripple under 1/8000. Solving Eqn. 15, this yields $$\frac{1}{8000} = 0.5\cdot(1-0.5)\cdot k \quad (16)$$

or $$k = 0.00005 \quad (17)$$

However, if the incrementer in pulse-width modulation circuit 300 (FIG. 3) operates at 1 GHz and counts from 1 to 1024, and with the thermal time constant of the material of 100 μs, k is estimated to be too large by a factor of 20. Consequently, in order to provide thermal tuning of optical device 200 (FIG. 2) with sufficiently low ripple, the incrementer may be operated 20× faster, the material time constant may be increased by a factor of 20 (for example, by etching away the material so that the thermal path to thermal ground is greatly reduced, thereby increasing its thermal resistance dramatically), and/or multiple instances of incrementers with smaller counters may be used.

Figure 5:
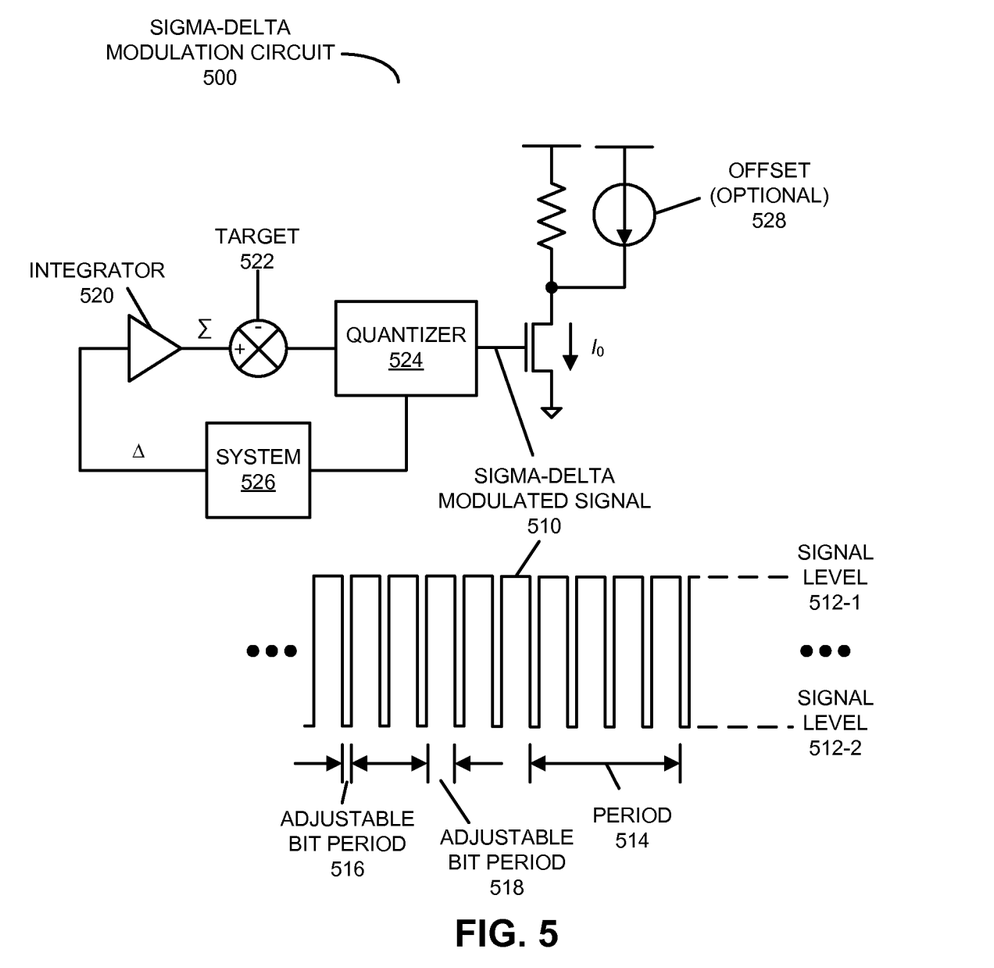
FIG. 5 is a block diagram illustrating a sigma-delta modulation circuit for use in the optical device of FIG. 2 in accordance with an embodiment of the present disclosure.

Alternatively, in some embodiments driver circuit 214 (FIG. 2) includes a sigma-delta modulation circuit. This may facilitate thermal tuning of optical device 200 (FIG. 2) with reduced ripple. For example, the sigma-delta modulation circuit may include a non-linear counter having different time increments (such as increasingly larger time steps). This is shown in FIG. 5, which presents a block diagram illustrating a sigma-delta modulation circuit 500 for use in optical device 200 (FIG. 2).

Thus, in some embodiments the pulse-width modulated signal output by the driver circuit may include a sigma-delta modulated signal 510 having at least two signal levels, including signal level 512-1 and signal level 512-2. In particular, system 226 may include a system-response look-up table that provides an input A to integrator 520. Moreover, the summed output from integrator 520 may be subtracted from a target 522 (which corresponds to the target operating temperature) and input to a quantizer 524 (such as a two-bit quantizer). This quantizer may output the sigma-delta modulated signal.

The sigma-delta modulated signal may include one or more instances of a modulation pattern with a period 514 (which is the inverse of the update frequency) having an adjustable bit period 516 in signal level 512-2 and an adjustable bit period 518 in signal level 512-1, thereby specifying a duty cycle of sigma-delta modulated signal 510 corresponding to the target operating temperature (in particular, the average pulse-width modulated heat associated with the modulation pattern may correspond to the target operating temperature). Note that bit period 516 or 518 may be a minimum bit period and/or may be smaller than the thermal time constant. Furthermore, period 514 may have a smaller duration than the thermal time constant. This approach may maintain the high-frequency content of the dithering, which is filtered out by the thermal time constant.

Operation of sigma-delta modulation circuit 500 is illustrated with several examples. In a first example, assume that the target duty cycle is 50%. In this case, the counter may start counting at 0, and may have a maximum count of 1024 (at which point it may automatically reset to 0). However, in the sigma-delta modulation technique, counting may be in steps of 512, modulo 1024. Consequently, the rules for the current source are: if a count does not exceed 1024, then leave the current source off; if a count exceeds 1024 and needs to be wrapped around, then turn the current source on. This results in the following operations, which illustrate how the current source is 'on' exactly half of the time.

1) With a count of 0, the current source is on.
2) With a count of 512, the current source is off.
3) With a count of 1024, the counter wraps back to 0 and the current source is on.
4) With a count of 512, the current source is off.
5) With a count of 1024, the counter wraps back to 0 and the current source is on.
6) With a count of 512, the current source is off.
7) With a count of 1024, the counter wraps back to 0 and the current source is on.

Note that the approach in this example is equivalent to pulse-width modulation circuit 300 (FIG. 3), if the incrementer counted to 2 (and not to 1024) and used a threshold of 1.

In a second example, the duty cycle is 25%. In this case, the counter may increment in steps of 256, which results in the following sequence of operations with the current source on 25% of the time.

1) With a count of 0, the current source is on.
2) With a count of 256, the current source is off.
3) With a count of 512, the current source is off.
4) With a count of 768, the current source is off.
5) With a count of 1024, the counter wraps back to 0 and the current source is on.
6) With a count of 256, the current source is off.
7) With a count of 512, the current source is off.

Once again, this approach is equivalent to pulse-width modulation circuit 300 (FIG. 3), if the incrementer counted to 4 (and not to 1024) and used a threshold of 1.

In a third example, the duty cycle is 7/8. In this case, the sequence of operations is:

1) With a count of 0, the current source is on.
2) With a count of 896, the current source is off.
3) With a count of 768, the current source is on.
4) With a count of 640, the current source is on.
5) With a count of 512, the current source is on.
6) With a count of 384, the current source is on.
7) With a count of 256, the current source is on.
8) With a count of 128, the current source is on.

9) With a count of 0, the current source is on.
10) With a count of 896, the current source is off.

The approach in this example is equivalent to pulse-width modulation circuit 300 (FIG. 3), if the incrementer counted to 8 (and not to 1024) and used a threshold of 7. Furthermore, note that the resulting ripple is identical to the incrementer coupling to 8 with a threshold of 1 because cooling and heating are reciprocal operations.

In a fourth example, the duty cycle is $1/1024$. In this case, the increment is 1, and the operation of sigma-delta modulation circuit 500 is identical to pulse-width modulation circuit 300 (FIG. 3).

As shown in Eqn. 15, the ripple associated with pulse-width modulation circuit 300 (FIG. 3) is a function of the duty cycle d, the ratio k of the counter period 222 (FIG. 2) and the thermal time constant of the material.

In the sigma-delta modulation technique, the effective time constant depends on the duty cycle. In the case of a 50% duty cycle, the effective counter period reduces to two cycles, which is an improvement of 512×. In the case of a 25% duty cycle, the effective counter period falls to four cycles, or an improvement of 256×. In the case of a $1/1024$ duty cycle, the effective counter period is unchanged. Using a 1024-tick counter, and assuming that d is less than 0.5, the improvement in the counter time constant can be expressed as $$k(d) = \frac{k}{1024 \cdot d} \tag{18}$$

Note that, if the duty cycle is greater than 50%, then the equivalent improvement in the counter time constant is $1024 \cdot (1-d)$. This is because of the symmetric nature of heating and cooling.

Substituting into Eqn. 15, where n represents the base counter period (for example, 1024 in the preceding example), and with d less than 0.5, the ripple is $$T_A - T_B = \frac{d \cdot (1-d) \cdot k}{d \cdot n} = (1-d) \cdot \frac{k}{n} \tag{19}$$

Note that the ripple is now a linear function of d.

Figure 6:
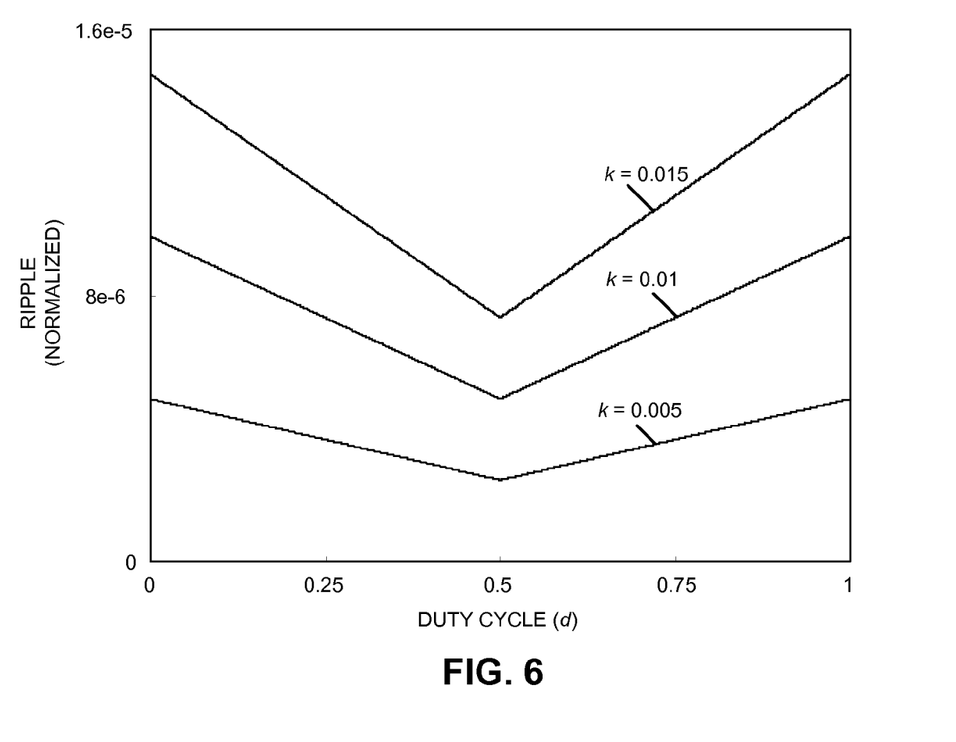
FIG. 6 is a graph of ripple associated with the sigma-delta modulation circuit of FIG. 5 in accordance with an embodiment of the present disclosure.

FIG. 6 presents a graph of ripple associated with sigma-delta modulation circuit 500 (FIG. 5). Relative to FIG. 4, it indicates that sigma-delta modulation circuit 500 (FIG. 5) offers superior ripple performance. Note that the maximum ripple is now at extrema values of d, where the reduction in the counter time constant is small and the sigma-delta modulation technique operates similarly to the pulse-width modulation technique. For example, in contrast to the previous analysis of pulse-width modulation circuit 300 (FIG. 3) with k equal to 0.01, the worst-case ripple at extrema values of d using sigma-delta modulation circuit 500 (FIG. 5) is approximately 0.00002 or more than 6× better than the desired maximum ripple of 0.000125.

Note that the ripple performance of sigma-delta modulation circuit 500 (FIG. 5) can be improved further. Unlike pulse-width modulation circuit 300 (FIG. 3), doubling the number of counters and having each one count to half the total count will not change the ripple of sigma-delta modulation circuit 500 (FIG. 5) because the effective counter period is already shortened by the modulo-math operation inherent to the sigma-delta modulation technique. Instead, one technique for reducing the maximum ripple is to run the counter at half the period as before. While this is an effective way to reduce the maximum excursion of the temperature at each steady-state setting, it may require a more complicated circuit.

Figure 7:
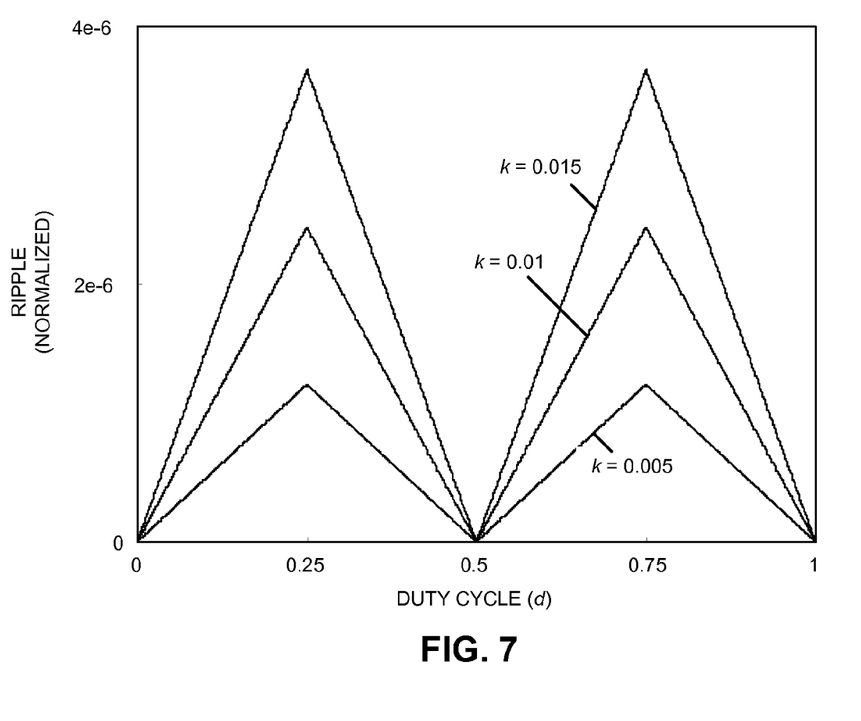
FIG. 7 is a graph of ripple associated with the sigma-delta modulation circuit of FIG. 5 (including an optional offset) in accordance with an embodiment of the present disclosure.

Referring back to FIG. 5, another technique for reducing the ripple is to introduce a half-current shift (represented by optional offset 528). Normally, by averaging between two input currents $I_A$ and $I_B$, sigma-delta modulation circuit 500 dithers between temperatures $T_A$ and $T_B$, . At the extremes of the dither duty cycle, the net currents are close to $I_A$ or $I_B$, . By adding a fixed current of magnitude $I_{half}=0.5 \cdot (I_A+I_B)$ to the output, the ripple curve in FIG. 6 can be effectively shifted by half of the period. Thus, instead of averaging between $I_A$ and $I_B$, sigma-delta modulation circuit 500 will average between $0.5 \cdot (I_A+I_B)$ and $1.5 \cdot I_A+0.5 \cdot I_B$. Note that in this embodiment the maximum ripple occurs at d=0.25 and d=0.75. FIG. 7 presents a graph of ripple associated with the sigma-delta modulation circuit 500 (including optional offset 528).

Figure 8:
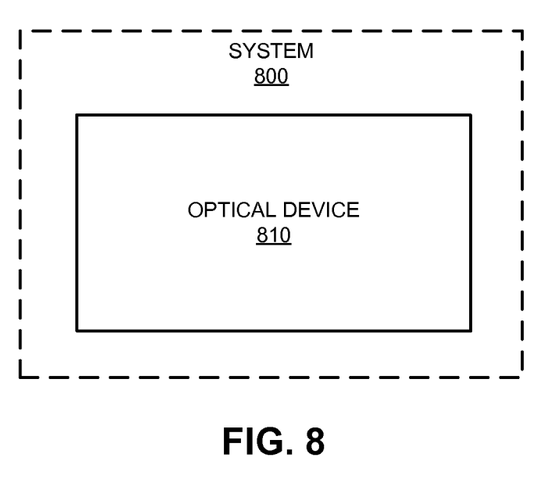
FIG. 8 is a block diagram illustrating a system that includes an optical device in accordance with an embodiment of the present disclosure.

One or more of the preceding embodiments of the optical device may be included in a system and/or an electronic device. This is illustrated in FIG. 8, which presents a block diagram illustrating a system 800 that includes an optical device 810.

The optical device may be used in a variety of applications, including: VLSI circuits, communication systems (such as WDM, an intra-chip optical link and/or an inter-chip optical link), storage area networks, data centers, networks (such as local area networks), and/or computer systems (such as multiple-processor-core computer systems). Note that system 800 may include, but is not limited to: a server, a laptop computer, a communication device or system, a personal computer, a work station, a mainframe computer, a back plane, a blade, an enterprise computer, a data center, a portable-computing device, a supercomputer, a network-attached-storage (NAS) system, a storage-area-network (SAN) system, a switch, a hub, a bridge, a router, and/or another electronic computing device. Moreover, note that system 800 may be at one location or may be distributed over multiple, geographically dispersed locations.

In some embodiments, one or more of the optical devices may be included in a multi-chip module (MCM) (such as a switch or a multiple-core processor) and/or in a system that includes the MCM. This MCM may include an array of chip modules (CMs) or single-chip modules (SCMs), and a given SCM may include at least one semiconductor die. Note that the MCM is sometimes referred to as a 'macro-chip.' Furthermore, the semiconductor die may communicate with other semiconductor dies, CMs, SCMs, and/or devices in the MCM using proximity communication of electromagnetically coupled signals (which is referred to as 'electromagnetic proximity communication'), such as capacitively coupled signals and/or proximity communication of optical signals (which are, respectively, referred to as 'electrical proximity communication' and 'optical proximity communication'). In some embodiments, the electromagnetic proximity communication includes inductively coupled signals and/or conductively coupled signals.

Optical device 200 (FIG. 2), pulse-width modulation circuit 300 (FIG. 3), sigma-delta modulation circuit 500 (FIG. 5), and/or optical system 800 may include fewer components or additional components. For example, in some embodiments optical device 200 (FIG. 2) is implemented on a silicon substrate (and, more generally, on a semiconductor substrate). In some embodiments, optical device 200 (FIG. 2) is implemented in a silicon layer in a silicon-on-insulator technology.

Although these devices and systems are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed.

Note that some or all of the functionality of the preceding embodiments may be implemented in one or more application-specific integrated circuits (ASICs) and/or one or more digital signal processors (DSPs). Furthermore, functionality in these embodiments may be implemented more in hardware and less in software, or less in hardware and more in software, as is known in the art. Additionally, the circuits in the preceding embodiments may be implemented using: complementary metal-oxide-semiconductor (CMOS), n-type metal-oxide-semiconductor (NMOS), p-type metal-oxide-semiconductor (PMOS) and/or bipolar junction transistors.

Figure 9:
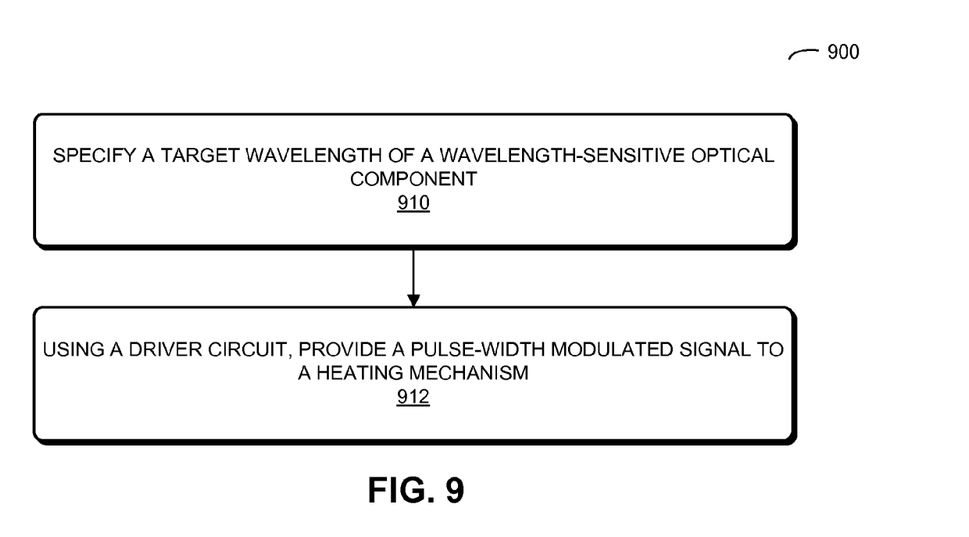
FIG. 9 is a flow chart illustrating a method for thermally tuning a wavelength-sensitive optical component in accordance with an embodiment of the present disclosure.

We now describe embodiments of the technique for thermally tuning a wavelength-sensitive optical component. FIG. 9 presents a flow chart illustrating a method 900 for thermally tuning a wavelength-sensitive optical component, such as the wavelength-sensitive optical component in one of the preceding embodiments of the optical device. During this method, a target operating wavelength of the wavelength-sensitive optical component is specified (operation 910). Then, using the driver circuit, the pulse-width modulated signal is provided to the heating mechanism (operation 912). Note that the average pulse-width modulated heat provided by the heating mechanism, which corresponds to the pulse-width modulated signal, thermally tunes the wavelength-sensitive optical component to the target operating wavelength. Furthermore, note that the target operating wavelength corresponds to the target operating temperature of the wavelength-sensitive optical component.

In some embodiments of method 900, there are additional or fewer operations. Moreover, the order of the operations may be changed and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical device, comprising:
    a wavelength-sensitive optical component having an associated thermal time constant, wherein an operating wavelength of the wavelength-sensitive optical component is a function of several physical parameters including temperature;
    a heating mechanism, thermally coupled to the wavelength-sensitive optical component, configured to provide heat to the wavelength-sensitive optical component; and
    a driver circuit, electrically coupled to the heating mechanism, configured to provide a pulse-width modulated signal to the heating mechanism, wherein an average pulse-width modulated heat provided by the heating mechanism, which corresponds to the pulse-width modulated signal, thermally tunes the wavelength-sensitive optical component to a target operating wavelength,
    wherein the target operating wavelength corresponds to a target operating temperature of the wavelength-sensitive optical component;
    wherein the driver circuit includes a sigma-delta modulation circuit; and
    wherein the sigma-delta modulation circuit includes a non-linear counter having different time increments.

2. The optical device of claim 1, wherein the heating mechanism includes a resistive heater; and
    wherein the pulse-width modulated signal includes a pulse-width modulated current.

3. The optical device of claim 1, wherein the pulse-width modulated signal includes two or more signal levels that can be selected from multiple pre-defined signal levels, thereby specifying an amplitude of the pulse-width modulated signal.

4. The optical device of claim 1, wherein the pulse-width modulated signal includes at least two signal levels, including a first signal level and a second signal level;
    wherein, during a period of the pulse-width modulated signal, the pulse-width modulated signal includes a first pulse having a first time duration in the first signal level and a second pulse having a second time duration in the second signal level, thereby specifying a duty cycle of the pulse-width modulated signal; and
    wherein the duty cycle, in conjunction with the heating mechanism and the time constant, corresponds to the target operating temperature.

5. The optical device of claim 4, wherein the period is smaller than the thermal time constant.

6. The optical device of claim 1, wherein the driver circuit includes a pulse-width modulation circuit; and
    wherein the pulse-width modulation circuit includes a linear counter having fixed time increments.

7. The optical device of claim 1, wherein the pulse-width modulated signal includes a sigma-delta modulated signal having at least two signal levels, including a first signal level and a second signal level, 8. The optical device of claim 7, wherein the sigma-delta modulated signal includes one or more instances of a modulation pattern having adjustable bit periods, wherein an average pulse-width modulated heat associated with the modulation pattern corresponds to the target operating temperature.

9. The optical device of claim 8, wherein at least one of the bit periods is a minimum bit period.

10. The optical device of claim 8, wherein at least one of the bit periods is smaller than the thermal time constant.

11. The optical device of claim 8, wherein the modulation pattern has a smaller duration than the thermal time constant.

12. The optical device of claim 1, wherein the pulse-width modulated signal includes a sigma-delta modulated signal having at least two signal levels; and
    wherein the sigma-delta modulation circuit includes an offset corresponding to an average of the at least two signal levels, thereby shifting peak ripple values of the sigma-delta modulated signal to other than extremum duty-cycle values.

13. A system, comprising an optical device, wherein the optical device includes:
    a wavelength-sensitive optical component having an associated thermal time constant, wherein an operating wavelength of the wavelength-sensitive optical component is a function of several physical parameters including temperature;

a heating mechanism, thermally coupled to the wavelength-sensitive optical component, configured to provide heat to the wavelength-sensitive optical component; and a driver circuit, electrically coupled to the heating mechanism, configured to provide a pulse-width modulated signal to the heating mechanism, wherein an average pulse-width modulated heat provided by the heating mechanism, which corresponds to the pulse-width modulated signal, thermally tunes the wavelength-sensitive optical component to a target operating wavelength, wherein the target operating wavelength corresponds to a target operating temperature of the wavelength-sensitive optical component;

wherein the driver circuit includes a sigma-delta modulation circuit; and wherein the sigma-delta modulation circuit includes a non-linear counter having different time increments.

14. The system of claim 13, wherein the heating mechanism includes a resistive heater; and wherein the pulse-width modulated signal includes a pulse-width modulated current.

15. The system of claim 13, wherein the pulse-width modulated signal includes two or more signal levels that can be selected from multiple pre-defined signal levels, thereby specifying an amplitude of the pulse-width modulated signal.

16. The system of claim 13, wherein the pulse-width modulated signal includes at least two signal levels, including a first signal level and a second signal level;

wherein, during a period of the pulse-width modulated signal, the pulse-width modulated signal includes a first pulse having a first time duration in the first signal level and a second pulse having a second time duration in the second signal level, thereby specifying a duty cycle of the pulse-width modulated signal; and wherein the duty cycle, in conjunction with the heating mechanism and the time constant, corresponds to the target operating temperature.

17. The system of claim 16, wherein the period is smaller than the thermal time constant.

18. The system of claim 13, wherein the pulse-width modulated signal includes a sigma-delta modulated signal having at least two signal levels, including a first signal level and a second signal level; and wherein the sigma-delta modulated signal includes one or more instances of a modulation pattern having adjustable bit periods, wherein an average pulse-width modulated heat associated with the modulation pattern corresponds to the target operating temperature.

19. The system of claim 18, wherein the modulation pattern has a smaller duration than the thermal time constant.

20. A method for thermally tuning a wavelength-sensitive optical component having an operating wavelength that is a function of several physical parameters including temperature and having an associated thermal time constant, wherein the method comprises:

specifying a target operating wavelength of the wavelength-sensitive optical component; and providing, using a driver circuit, a pulse-width modulated signal to a heating mechanism that is thermally coupled to the wavelength-sensitive optical component, wherein an average pulse-width modulated heat provided by the heating mechanism, which corresponds to the pulse-width modulated signal, thermally tunes the wavelength-sensitive optical component to a target operating wavelength, wherein the target operating wavelength corresponds to a target operating temperature of the wavelength-sensitive optical component;

wherein the driver circuit includes a sigma-delta modulation circuit; and wherein the sigma-delta modulation circuit includes a non-linear counter having different time increments.

* * * * *

UNITED STATES PATENT AND TRADEMARK OFFICE
CERTIFICATE OF CORRECTION

| | | Page 1 of 1 |
|---|---|---|
| PATENT NO. | : 8,599,468 B2 | |
| APPLICATION NO. | : 13/205749 | |
| DATED | : December 3, 2013 | |
| INVENTOR(S) | : Liu et al. | |

It is certified that error appears in the above-identified patent and that said Letters Patent is hereby corrected as shown below:

In the Claims:

In column 14, line 44, in Claim 7, delete "level," and insert -- level. --, therefor.

Signed and Sealed this
Tenth Day of June, 2014

Michelle K. Lee
*Deputy Director of the United States Patent and Trademark Office*